Feb. 15, 1966        H. T. KUCERA        3,235,692

CONDITION RESPONSIVE SEQUENCE SWITCH

Original Filed Nov. 25, 1959        3 Sheets-Sheet 1

INVENTOR.
HENRY T. KUCERA
BY
Robertson & Smythe
ATTORNEY

Feb. 15, 1966 H. T. KUCERA 3,235,692
CONDITION RESPONSIVE SEQUENCE SWITCH
Original Filed Nov. 25, 1959 3 Sheets-Sheet 2

INVENTOR.
HENRY T. KUCERA
BY
Robertson & Smythe
ATTORNEYS

Feb. 15, 1966     H. T. KUCERA     3,235,692
CONDITION RESPONSIVE SEQUENCE SWITCH
Original Filed Nov. 25, 1959                    3 Sheets-Sheet 3

INVENTOR.
HENRY T. KUCERA
BY
Robertson & Smythe
ATTORNEYS

United States Patent Office 3,235,692
Patented Feb. 15, 1966

3,235,692
CONDITION RESPONSIVE SEQUENCE SWITCH
Henry T. Kucera, Doylestown, Pa., assignor to Ametek, Inc., New York, N.Y., a corporation of Delaware
Continuation of application Ser. No. 855,334, Nov. 25, 1959. This application Nov. 30, 1962, Ser. No. 244,539
5 Claims. (Cl. 200—140)

This application is a continuation of application Serial No. 855,334, filed November 25, 1959, now abandoned.

The present invention relates to controllers including electrical sequence switches, and particularly to a new and improved controller having a sequence switching means in which a plurality of adjustable differential condition responsive contacts are included in such a manner that the range over which the plurality of contacts are effective may also be adjusted.

In many conditioning processes, sequential operation of a plurality of individual electrical circuits may be required in order to maintain a substaintially constant condition at a desired location. It often occurs that the operation of these circuits must not only be sequentially controlled in predetermined steps within a specified range of conditions, but also the base or datum from which the range is measured may also require adjustment, without disturbing the stepped relation of the sequential operations of the electrical circuits.

An object of this invention is to provide a controller including a switching means for a plurality of separate electrical circuits in which said circuits may be energized or de-energized in a predetermined stepped relation by a predetermined variation of a condition measured from a presettable base or datum condition.

Another object of this invention is to provide such a controller including a sequence switch in which condition responsive means may be caused to sequentially operate a plurality of electrical contacts in which each set of contacts is individually and micrometrically adjustable relatively to every other set of contacts.

Another object of this invention is to provide such a controller including a sequence switch in which not only may the individual sets of contacts be adjusted relatively to each other to provide a range of stepped sequential operations, but the base or datum from which said range is measured may be adjusted while still maintaining intact the stepped sequential relation of the operations within said range.

Another object of this invention is to provide such a controller including a sequential switch that may be responsive to variations of conditions at two or more designated locations with the degree of response at any one of the locations and with the rate of response per unit of condition change being variable with respect to the response at other locations.

Still another object of the invention is to provide such a controller including a sequential switch that may be responsive only to variations of a condition at a designated location or locations and insensitive to condition variations at other locations.

Another object of the invention is to provide such a controller including a sequence switch in which great flexibility of adjustment of the various sets of contacts of the sequence switch is possible.

In one aspect of the invention, the controller may comprise a pivoted lever that may be caused to oscillate about its pivot through the action of a bellows or the like that is caused to expand and collapse by the action of a remotely located condition responsive device. A set of individual switches for separate circuits of a process may be arranged in fixed relation to each other along the pivoted lever with their contact making plungers in line with said lever. Separate micrometrically adjustable set screws may be mounted longitudinally along said lever, one in alignment with each of the plungers of the various switches.

In another aspect of the invention, adjustable means may be provided between the expansible bellows and the pivoted lever so that the datum from which the range of sequential operations of the various switch contacts is measured may be adjusted without disturbing the preadjusted relationship of the contacts of each switch relatively to the other.

In still another aspect of the invention, a main lever may be pivotally mounted and may include a transverse portion on which may be arranged a plurality of aligned micrometrically adjustable set screws, one for each of a plurality of aligned switches fixedly mounted relatively to said set screws. The set screws may also be mounted for cooperation with pivotally mounted switch actuators in order to provide flexibility of operation of the switch actuators for varying the sequence of operation of the switches when the main lever is caused to oscillate in response to the actuation of an expansible bellows.

In still another aspect of the invention, the pivoted main lever may be of a bimetallic construction for compensating for changing conditions that may affect the operation of the bellows independently of the condition responsive means for that purpose.

In still another aspect of the invention, relative motion may be provided between the main lever and the plurality of switches by means that may be responsive to the ambient condition affecting the capillary and/or bellows means that oscillates the main lever.

The above, other objects and novel features of the controller will become apparent from the following specification and accompanying drawings which are merely exemplary.

Figure 1:
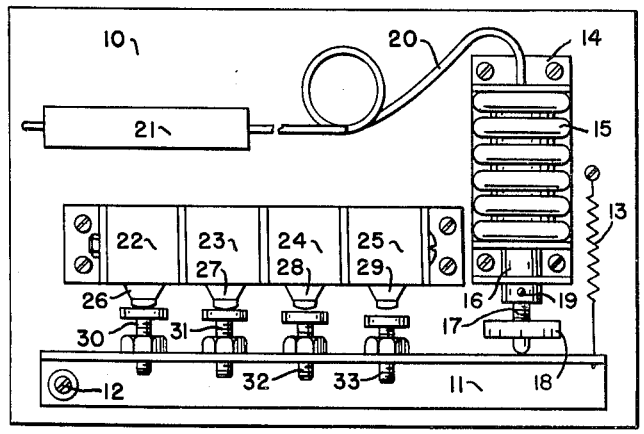
FIG. 1 is a schematic showing of a sequence controller to which the principles of the invention have been applied.

Referring to the drawings, and particularly to FIG. 1, the principles of the invention are shown as applied to a controller including a base 10. A lever 11 is mounted on a pivot 12 fixed to base 10. The end of lever 11 opposite that connected to pivot 12 is attached to the one end of a spring 13, the opposite end of which is fixed to base 10.

A bracket 14, also mounted on base 10, supports an expansible bellows 15, the lower end of which is closed and includes a threaded collar 16 into which is threaded an adjustable plunger 17 to which is fixed an indicating collar 18. The plunger 17 abuts the end of the lever 11 and the spring 13 maintains the lever 11 in contact with the plunger 17. Rotating the indicator 18 causes movement of the lever 11 toward and from the bellows 15 against the action of the spring 13. A set screw 19 in collar 16 may be employed to lock the plunger 17 in adjusted position for a purpose to be described later.

The interior of the bellows 15 may be in communication with one end of a flexible capillary tube 20, to the opposite end of which a condition responsive element 21 may be connected, which in the embodiment disclosed is shown as a temperature responsive element. From the foregoing it is evident that variations in temperature to which element 21 is subjected will cause expansion and contraction of the bellows 15, thus moving lever 11 about its pivotal mounting 12.

A plurality of individual switches 22, 23, 24 and 25 may be fixedly mounted on the base 10 in aligned relation above the lever 11. The switches 22 to 25, inclusive, may have switch actuating stems or plungers 26, 27, 28 and 29, respectively. Micrometrically adjustable set screws 30, 31, 32 and 33 may be mounted on the lever 11 in line, respectively, with plungers 26, 27, 28 and 29. A lock nut may be provided for each of the set screws to lock them at adjusted positions relatively to their corresponding switch plungers. There may be any desired number of the switches 22 to 25 and they may be included in various circuits desired to be controlled in a sequential order for controlling a process involving such circuits.

From the foregoing it is evident that as the lever 11 pivots in response to a range of temperature variations of the element 21, a very fine differential action may be provided between the sequential action of the switches 22 to 25 by adjusting the micrometer screws 30 to 33. Furthermore, it is evident that the datum of the range of such temperature variations of element 21 within which the switches 22 to 25 will operate in a predetermined sequential order may be varied by turning the disk 18 to vary the position of lever 11 relatively to the bellows 15. In other words, the micrometer screws 30 to 33 may be set so that switches 22 to 25 may be closed or opened at intervals as small as a half degree Fahrenheit, measured from a base temperature of, say, 15° F. The overall temperature range within which switches 22 to 25 may operate may be as great as about 100° F., although the differential adjustment between the screws 30 to 33 as well as said overall temperature range may be varied as desired. By adjusting plunger 17, any preset sequential order of operating switches 22 to 25 may be maintained within a range having a base or datum of any predetermined value within the limits of operation of the controller.

Figure 2:
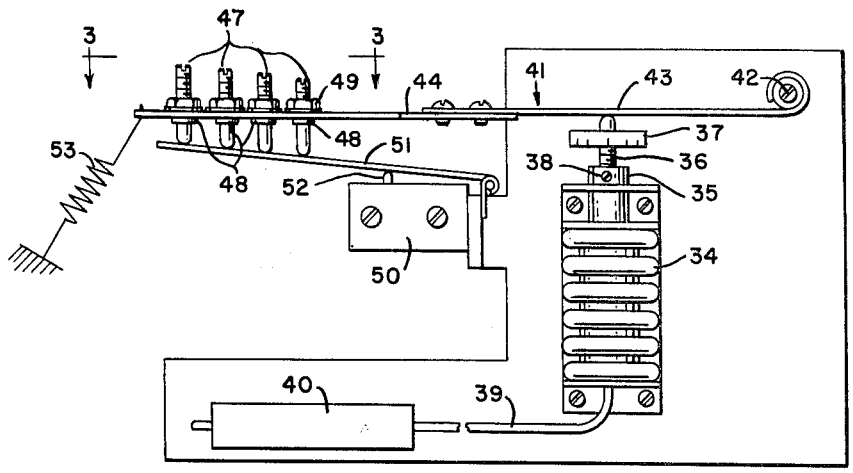
FIG. 2 is a schematic showing of a modification of the showing in FIG. 1.

Referring to FIG. 2, the principles of the invention are shown schematically as applied to a controller including a bellows 34 having its one end fixed and its other end movable. The movable end of the bellows 34 may include a threaded collar 35 into which a threaded plunger 36 may be threaded. A dial 37 may be fixed to the threaded plunger 36 and a set screw 38 may be located in the collar 35 for locking the plunger 36 in any predetermined adjusted position.

Figure 3:
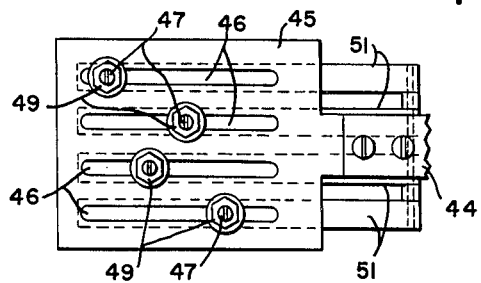
FIG. 3 is a view looking in the direction of the arrows along line 3—3 of FIG. 2.

The interior of the bellows 34 may be in communication with a capillary tube 39 that is connected to a condition responsive element 40. A lever 41 may be mounted on a pivot 42 in position to contact the free end of the plunger 36. The lever 41 may include a portion 43 that may be attached to another portion 44. Referring to FIG. 3, the portion 44 may include an enlarged transverse portion 45 having a plurality of parallel spaced slots 46 therein. A micrometric, axially adjustable set screw 47 may be mounted on portion 45 within a slot 46. Each set screw 47 may include a collar 48 threaded thereon and adapted to engage the bottom face of the portion 45 of lever 41. A lock nut 49 may be threaded onto each screw 47 so as to lock each screw 47 in an axially adjusted position within its corresponding slot 46.

A plurality of snap action switches 50 may be arranged side by side beneath the portion 45 such that each is directly below one of the slots 46. A pivoted leaf spring 51 may be connected to each switch 50 so that it overlies a corresponding actuating plunger 52 of said switch. A spring 53 may be employed to resiliently urge the composite lever 41 downwardly (FIG. 2) into engagement with the plunger 36 of the bellows 34.

By adjusting the screws 47 not only axially but also along the slots 46, various combinations of sequential actuation of the switches 50 may be effected within a predetermined range of temperatures measured from a predetermined datum temperature depending upon the adjustment of the plunger 36 occasioned by the operation of dial 37. The leaf springs 51 being made of spring steel permits the continued downward movement of the lever 41 until all of the switches 50 have been actuated.

In some installations, the bellows 34 and capillary tube 39 may be subjected to periodic temperature variations while the temperature responsive element 40 is located at a place where it is subjected to less frequent temperature variations. In this case, erroneous operation of the lever 41 may occur. In the present embodiment, this may be overcome by making portion 43 and/or portion 44 of bimetallic construction to compensate for the increased movement of lever 41 by the temperature variations that affect the bellows 34 and capillary tube 39. A reversely acting bellows arrangement in conjunction with the bellows 34 may also be employed to provide this compensating effect.

Figure 4:
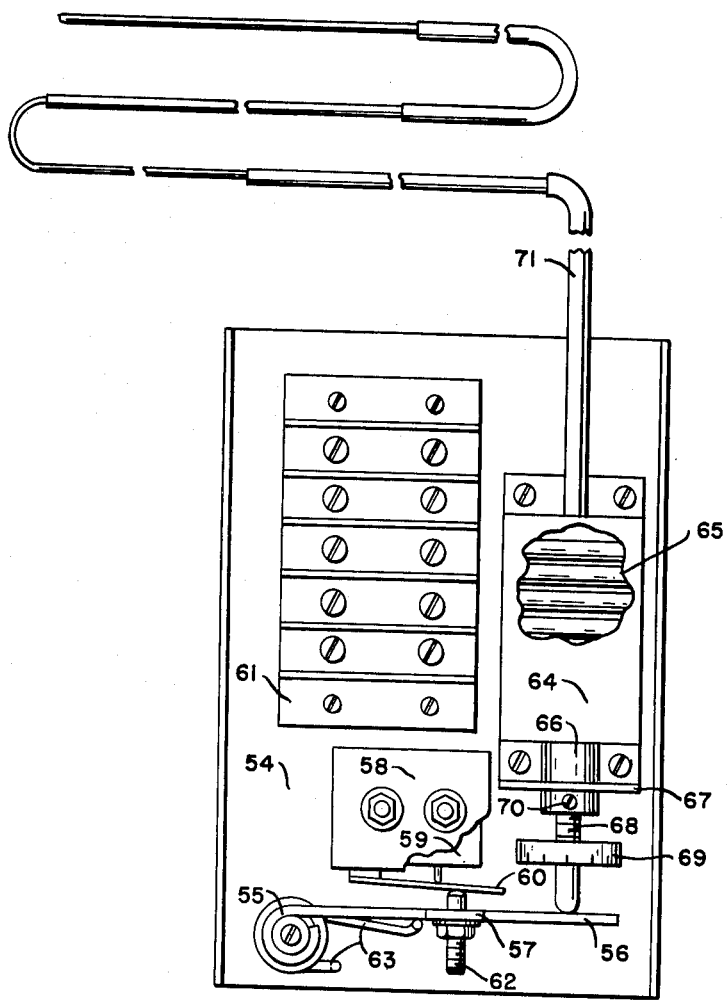
FIG. 4 is a view of a controller embodying a modified form of the structure shown in FIGS. 1 to 3.

Referring to FIG. 4, the principles of the invention are shown as applied to a controller including a frame 54 on which a pivot bearing 55 is mounted. A lever 56 may be connected to the pivot bearing 55 and it may include a transverse cross member 57.

A housing 58, fixed to frame 54, may support a plurality of aligned snap action switches 59 having plunger actuators arranged directly in line with pivotally mounted leaf springs 60 in the same way that springs 51 are arranged relatively to switch actuators 52 in FIG. 2. The switches 59 may be wired to a terminal block 61 for facilitating its use with a plurality of electrical circuits to be energized in a predetermined sequential order.

Individual micrometrically adjustable screws 62 may be mounted on, and extend through, the cross member 57 for cooperation with the individual leaf springs 60. Locking nuts may be threaded onto the screws 62 to lock them in predetermined axially adjusted position. A torsion spring 63 associated with the pivot bearing 55 may be arranged to urge the lever 56 is a counterclockwise direction for a purpose presently to be described.

A housing 64, fixed to frame 54, may contain an expansible bellows 65. The top of the bellows 65 may be fixed to the housing 64, and the remainder may be permitted to reciprocate within the housing 64 in response to variations of the condition responsive media within the bellows. The end of the bellows 65 opposite that fixed to the housing 64 may include a shaft 66 that is adapted to extend through a guide bearing 67 fixed to frame 54. A threaded plunger 68 having a dial 69 fixed thereto may be screwed into the shaft 66 and locked in any adjusted axial position by a set screw 70.

The upper fixed end of the bellows 65 may be connected to a flexible capillary tube 71 that may include various sections of different cross sectional construction so as to contain different volumes of temperature responsive expansible liquid.

The capillary tube 71 may extend to a plurality of different locations, with a determinable length and cross section in each location, each location being subjected to different temperature variations. The action of bellows 65 is then the result of the summation of the temperature effects at the various locations. By adjusting the various screws 62 in the cross member 57, the corresponding snap action switches may be operated in any predetermined sequential order, within a range of the summation effects of temperature variations affecting the capillary tube 71, upon the lever 56 being oscillated about pivot bearing 55 by the reciprocation of the plunger 68. The dial 69 may be rotated to vary the datum from which said range of summation effects are measured.

Figure 5:
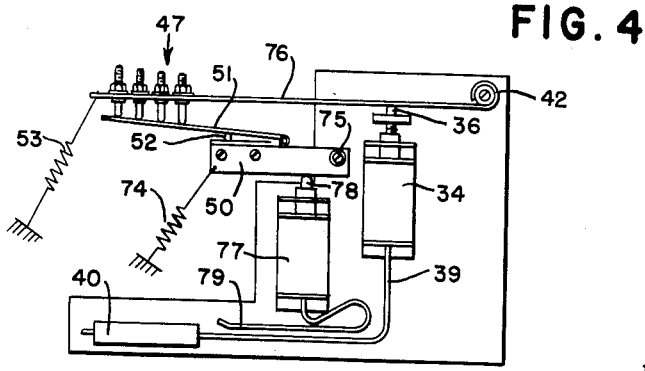
FIG. 5 is a modification of the controller shown in FIG. 2.

As a further embodiment, the switches 50 of FIG. 2 can be mounted on a pivoted support which is actuated by a compensating arrangement. Referring to FIG. 5, wherein parts similar to FIG. 2 are given the same numerals, switches 50 are mounted on pivot 75. Leaf springs 51 are arranged to actuate plunger 52 of the respective switches. Spring 53 resiliently urges lever 76 into engagement with plunger 36 of bellows 34, and screws 47 are arranged to operate the respective switches. Compensating bellows 77 has a plunger 78 and capillary 79 for moving the switch assembly about its pivot 75, so as to compensate for ambient temperature of the bellows 34, as well as the capillary 39. The volume of bellows 34 and capillary 39 should be substantially the same as that of bellows 77 and capillary 79. The same effect could be produced by using different motion transmitting means.

Figure 6:
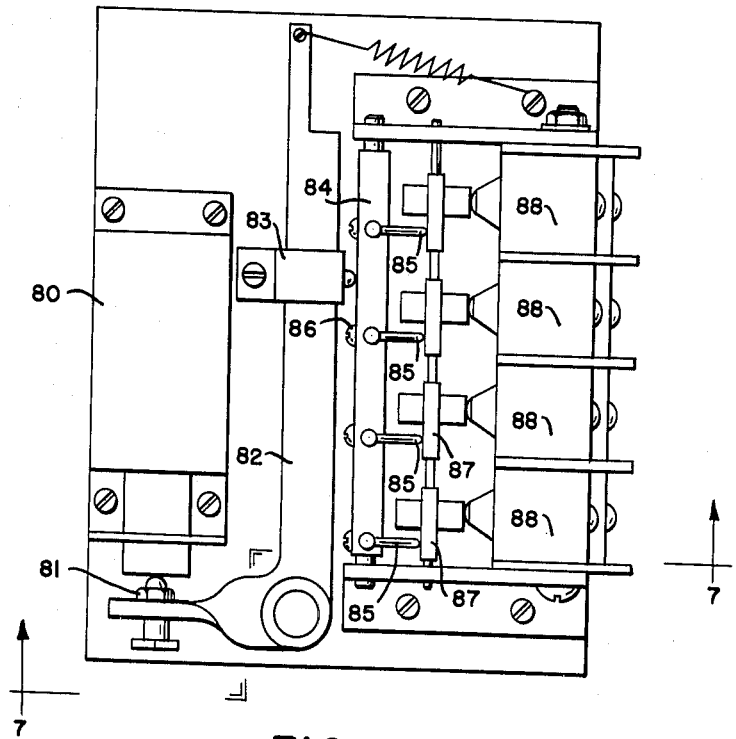
FIG. 6 is a still further modification.
Figure 7:
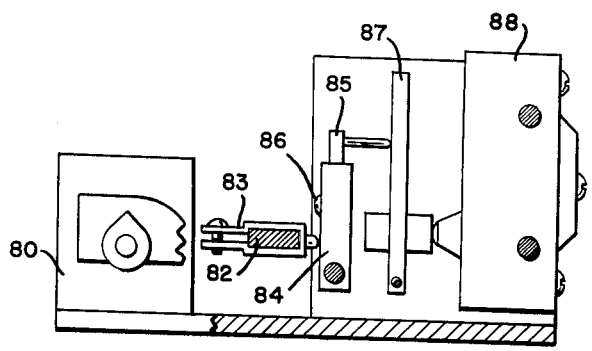
FIG. 7 is an end view of FIG. 6.

FIG. 6 shows another arrangement of the lever system for operating the switches. Condition responsive means 80 has an adjustable connection 81 to main lever 82. Main lever 82 has a longitudinally adjustable member 83 for rotating second lever 84 which in turn has an adjustable movement transmitting lever 85, set screw 86 locking the lever 85 in adjusted position. Operating levers 87 are arranged to actuate switches 88 in the same manner as for the other forms. It should be apparent that the movement transmitting lever 85 could be affixed to the main lever or to the second lever. This arrangement makes it possible to adjust for desired differential of all switches jointly and further arrange for separate adjustment of the operating differential of each switch.

It should be evident that in place of the thermoresponsive bellows, other condition responsive means can be employed such as a pressure actuated diaphragm or bellows, wafers, a motor or spring actuated timing device to cause movement of the operating lever at a rate proportional to elapsed time, or a combination thereof. Further, in the arrangement of FIG. 4, the divisions of the capillary or bulb 71 can be proportioned as to liquid content and the switches adjusted or sequenced to cause sequencing of the switches with a rise in house temperature, or with a relatively constant house temperature where the liquid content of the bulb measuring house temperature is proportioned such that the temperature effect of the house temperature responsive liquid is less than the temperature effect of the liquid responsive to outdoor temperature. Other responsive arrangements also could be used.

As an example, the temperature responsive means for measuring the condition at a designated location may be replaced by pressure responsive means, or by time responsive means. In still another form, time responsive means may cooperate with either temperature or pressure measuring means for effecting the movement of the lever arrangement causing sequencing switching action. Other variations include the mounting of the switches on the pivoted lever and maintaining the switch actuators in fixed relationship.

In place of the leaf springs 51, 60, etc., suitable lost motion connections (not shown) can be used, permitting actuation of the switch plunger but providing for overtravel.

Although the various features of the new and improved controller have been shown and described in detail to fully disclose several embodiments of the invention, it will be evident that changes may be made in such details and certain features may be used without others without departing from the principles of the invention.

What is claimed is:

1. In a controller, a base; a lever pivotally connected to said base and including a transversely extending arm portion having longitudinally extending, parallel spaced slots therein; a plurality of switches having switch actuating plungers mounted on said base transversely of said lever and each disposed beneath one of said slots; a separate pivotally mounted leaf spring on each of said switches and lying over the actuating plunger thereof; micrometrically adjustable screw means extending through each of said slots of said lever arm portion and overlying a corresponding leaf spring; means for adjustably locking said micrometrically adjustable screw means along its corresponding slot as well as at different positions along its longitudinal axis; and condition responsive means mounted on said base and including a member in contact with said lever for oscillating said lever.

2. In a controller, a base; a lever pivotally connected to said base and including a transversely extending arm portion having longitudinally extending, parallel spaced slots therein; a plurality of switches having switch actuating plungers mounted on said base transversely of said lever and each disposed beneath one of said slots; a separate pivotally mounted leaf spring on each of said switches and lying over the actuating plunger thereof; micrometrically adjustable screw means extending through each of said slots of said lever arm portion and overlying a corresponding leaf spring; means for adjustably locking said micrometrically adjustable screw means along its corresponding slot as well as at different positions along its longitudinal axis; condition responsive means mounted on said base and including a member in contact with said lever for oscillating said lever; a condition responsive element; and a capillary tube connecting said condition responsive element to said condition responsive means on said base.

3. In a sequence controller, a plurality of electrical switches adapted to be connected into electrical circuits for controlling a process; a main lever, pivotally mounted for actuating said switches in sequential order; micrometrically adjustable screws mounted on said main lever, each in cooperating position with one of said switches; expansible bellows means for oscillating said lever about its pivot including a plunger in engagement with said lever; and compensating means for providing relative motion between said switches and said main lever, said compensating means being responsive to ambient conditions affecting said bellows means.

4. In a sequence controller, a plurality of electrical switches adapted to be connected into electrical circuits for controlling a process; a main lever pivotally mounted for actuating said switches in sequential order; micrometrically adjustable screws mounted on said main lever each lying over one of said switches; temperature responsive means including a bulb; interconnecting capillary and expansible bellows means connected to said bulb for oscillating said lever about its pivot including a plunger in engagement with said lever; and compensating means for providing relative motion between said switches and said main lever, said compensating means being responsive to ambient conditions affecting said capillary and bellows means.

5. In a sequence controller, a plurality of electrical switches adapted to be connected into electrical circuits for controlling a process; a main lever, means pivotally mounting said lever for actuating said switches in sequential order; switch actuator means; means horizontally and vertically adjustable and cooperating with said actuator means of one of said switches for varying the sequence of operation thereof; a condition responsive means including an expansible bellows for oscillating said lever about its pivot; said condition responsive means further including a member having a threaded plunger in contact with said lever for oscillating said lever; and a dial integral with said threaded plunger for adjustably setting said plunger to provide a predetermined relationship between said lever and said switches.

References Cited by the Examiner
UNITED STATES PATENTS

| | | | |
|---|---|---|---|
| 2,288,517 | 6/1942 | Dubilier | 200—140 |
| 2,289,882 | 7/1942 | Myers | 200—83 |
| 2,391,881 | 1/1946 | Clay. | |
| 2,578,340 | 12/1951 | De Lancey. | |
| 3,050,600 | 8/1962 | Booth et al. | 200—153 X |

BERNARD A. GILHEANY, *Primary Examiner.*

ROBERT K. SCHAEFER, *Examiner.*